(12) United States Patent
Park

(10) Patent No.: US 8,714,803 B2
(45) Date of Patent: May 6, 2014

(54) LIGHTING DEVICE USING LIGHT GUIDE PLATE

(76) Inventor: Hyu Wan Park, Incheon (KR)

( * ) Notice: Subject to any disclaimer, the term of this patent is extended or adjusted under 35 U.S.C. 154(b) by 447 days.

(21) Appl. No.: 12/597,159

(22) PCT Filed: Apr. 21, 2008

(86) PCT No.: PCT/KR2008/002243
§ 371 (c)(1),
(2), (4) Date: Oct. 22, 2009

(87) PCT Pub. No.: WO2008/133421
PCT Pub. Date: Nov. 6, 2008

(65) Prior Publication Data
US 2010/0085774 A1 Apr. 8, 2010

(30) Foreign Application Priority Data

Apr. 25, 2007 (KR) .................. 10-2007-0040541
Dec. 24, 2007 (KR) .................. 10-2007-0136386

(51) Int. Cl.
*F21V 7/04* (2006.01)

(52) U.S. Cl.
USPC ............ 362/615; 362/623; 362/624; 362/619

(58) Field of Classification Search
USPC .................... 362/615, 619, 623, 634
See application file for complete search history.

(56) References Cited

U.S. PATENT DOCUMENTS

| 5,808,708 | A  | * | 9/1998  | Oyama et al. .......... 349/65 |
| 6,545,734 | B2 | * | 4/2003  | Cornelissen et al. ..... 349/63 |
| 7,175,310 | B1 | * | 2/2007  | Cotterell ............. 362/253 |
| 7,293,908 | B2 | * | 11/2007 | Beeson et al. ......... 362/612 |
| 2002/0008969 | A1 | * | 1/2002 | Mabuchi et al. ....... 362/31 |
| 2004/0141303 | A1 | * | 7/2004 | Ladstaetter et al. .... 362/31 |
| 2005/0007753 | A1 | * | 1/2005 | Van Hees et al. ...... 362/31 |
| 2005/0276075 | A1 | * | 12/2005 | Chen et al. .......... 362/615 |
| 2006/0114690 | A1 | * | 6/2006  | Iki et al. ........... 362/612 |
| 2006/0221638 | A1 | * | 10/2006 | Chew et al. .......... 362/613 |
| 2007/0030693 | A1 | * | 2/2007  | Karlsson ............. 362/605 |
| 2007/0030696 | A1 | * | 2/2007  | Lv et al. ............ 362/615 |
| 2007/0047262 | A1 | * | 3/2007  | Schardt et al. ....... 362/623 |
| 2007/0058394 | A1 | * | 3/2007  | Yu ................... 362/615 |
| 2007/0076433 | A1 | * | 4/2007  | Kinoshita et al. ..... 362/615 |

FOREIGN PATENT DOCUMENTS

| JP | 2003-084140 | 3/2003 |
| KR | 1020030016631 | 3/2003 |
| KR | 1020070040012 | 4/2007 |

* cited by examiner

*Primary Examiner* — Jong-Suk (James) Lee
*Assistant Examiner* — Bryon T Gyllstrom
(74) *Attorney, Agent, or Firm* — IPLA P.A.; James E. Bame

(57) ABSTRACT

Disclosed herein is a lighting device using a light guide plate. The lighting device includes a light guide plate, and light source units. The light guide plate is configured such that the front surface thereof, through which light beams are emitted, is divided or blocked into a plurality of portions by forming light transmission preventing grooves. The light source units are configured such that the light guide plate reflects the light beams.

5 Claims, 7 Drawing Sheets

(a)

(b)

(c)

LIGHTING DEVICE USING LIGHT GUIDE PLATE

TECHNICAL FIELD

The present invention relates to a lighting device using a light guide plate, which can realize both a lighting function and an advertising function by emitting light beams, which are emitted from light sources, through the light guide plate and, more particularly, to a lighting device using a light guide plate, in which the light guide plate is divided into a plurality of light emission blocks and different light beams are emitted to respective blocks, thus being easily installed on a wall surface or a ceiling without spoiling the outward appearance of the device, as well as realizing different levels of brightness for respective blocks, enabling various shapes or colors to be exhibited, and providing a luminous intensity brighter than that provided by a conventional light guide plate.

BACKGROUND ART

Generally, a lighting device using a light guide plate emits light into a flat-plate-shaped light guide plate, which is made of light-transmitting plastic or acryl resin, using light sources, such as Cold-Cathode Fluorescent Lamps (CCFLs) or Light-Emitting Diodes (LED), and is thus used as indoor lighting or an advertising panel.

For example, as shown in FIG. 1, a conventional lighting device using a light guide plate 100 is configured such that light sources 131, such as CCFLs or LEDs, which are fastened to boards 132, are mounted on both side surfaces of a light guide plate 110 using protective covers 133, a plurality of light reflecting grooves 111 is formed in the rear surface of the light guide plate 110 to have a predetermined shape, and a reflection sheet 120 is mounted on the rear surface of the light guide plate 110, in which the light reflecting grooves 111 are formed.

Accordingly, when the light sources 131 receive power, which is supplied from the outside, and start to emit light beams, the light beams, which are emitted into the light guide plate 110, are reflected by the light reflecting grooves 111 and are emitted in the direction of the front surface of the light guide plate 110, and thus various shapes, such as patterns, characters and figures, can be exhibited, and a function as indoor lighting or an advertising panel can also be realized using the light beams, which are emitted as described above.

However, the above-described lighting device using a light guide plate 100 is configured such that an entire single light guide plate 110 can be used as only a single light emitting unit, so that there are problems in that it is impossible to adjust the brightness of respective portions thereof using a single light guide plate 110, and in that various kinds of plants, animals or objects, which have various shapes or colors, cannot be appropriately exhibited for respective portions.

Furthermore, the light sources 131 are mounted close to only both edges of the light guide plate 110, so that there are problems in that sufficient luminous intensity that is required for a lighting device is not attained, and in that it is difficult to manufacture a large and thin lighting device using a light guide plate 100.

Furthermore, when the above-described lighting device using a light guide plate 110 is installed on a wall surface or a ceiling and is fastened thereto, there is a problem in that a separate fastening means, for securely fastening the lighting device without spoiling the outer appearance thereof, is not provided.

DISCLOSURE

Technical Problem

Accordingly, the present invention has been made to solve the above-described problems, and the present invention is directed to provide a lighting device using a light guide plate, which can realize both a lighting function and an advertising function by emitting light beams, which are emitted from light sources, through the light guide plate, and which enables the light guide plate to be divided into a plurality of light emission blocks, and enables different light beams to be emitted to the respective block, thus not only realizing different levels of brightness for respective blocks, but also enabling the exhibition of various shapes or colors.

Furthermore, the present invention is directed to provide a lighting device using a light guide plate, which is configured to provide a bright luminous intensity, thus enabling the manufacture of a large and thin lighting device using a light guide plate.

Furthermore, the present invention is directed to provide a lighting device using a light guide plate, which can be easily installed on a wall surface or a ceiling without spoiling the outer appearance of the device.

Technical Solution

In order to accomplish the above objects, the present invention provides a lighting device using a light guide plate, including: a light guide plate configured light transmission preventing grooves for dividing a front surface which light beams are emitted into a plurality of portions by blocking of the light transmission and a light reflection unit which reflects the light beams from the light source units; light source units that emit the light beams toward a light reflection unit or the sidepiece of a light guide plate, and a reflection sheet coupled to a rear surface of the light guide plate to reflect light beams, which are emitted from the light source units, in a direction of a front surface of the light guide plate.

In this case, the light reflection unit is provided with either light reflection grooves or a printed layer.

Furthermore, it is preferred that the light source units be inserted into the light transmission preventing grooves.

Furthermore, each of the light source units is mounted so as to emit light to any or all of two portions of the light guide plate, which are obtained by dividing the light guide plate along the boundary line of each light transmission preventing groove.

Furthermore, it is preferred that the lighting device further include a fastening plate coupled to the rear surface of the reflection sheet to bring the reflection sheet into close contact with the light guide plate, and brought into close contact with the protective covers of the light source units to radiate heat generated by the light source units.

Furthermore, the light source units include a board on which an electrical circuit having a predetermined pattern is formed; light sources mounted to a board to emit the light beams; and a reflection unit mounted to a board to increase the light reflectance.

Furthermore, it is preferred that the lighting device further include protective covers coupled to respective rear surfaces of the light source units to protect the light source units from an external environment and to radiate heat generated by the light source units.

Furthermore, the light guide plate is provided with mounting grooves, which are formed in respective side portions thereof, and the light source units are mounted in the mounting grooves.

Furthermore, it is preferred that the lighting device further include one selected from among a colored sheet, a piece of paper and a piece of cloth, which is attached to the rear surface of the light guide plate surface.

Furthermore, the light transmission preventing grooves are slots that are formed in the light guide plate.

Advantageous Effects

In the above-described lighting device using a light guide plate according to the present invention, both a lighting function and an advertising function can be realized by emitting light beams, which are emitted from light sources, through the light guide plate, and which enables the light guide plate to be divided into plurality of light emission blocks and enables different light beams to be emitted to the respective block, thus not only realizing different levels of brightness for respective blocks, but also enabling the exhibition of various shapes or colors.

Furthermore, the lighting device using a light guide plate is configured to provide a bright luminous intensity, thus enabling the manufacture of a large and thin lighting device using a light guide plate. Furthermore, the lighting device using a light guide plate can be easily installed on a wall surface or a ceiling without spoiling the outer appearance of the device.

BEST MODE

A lighting device using a light guide plate according to a preferred embodiment of the present invention is described in detail with reference to the accompanying drawings below.

Figure 2:
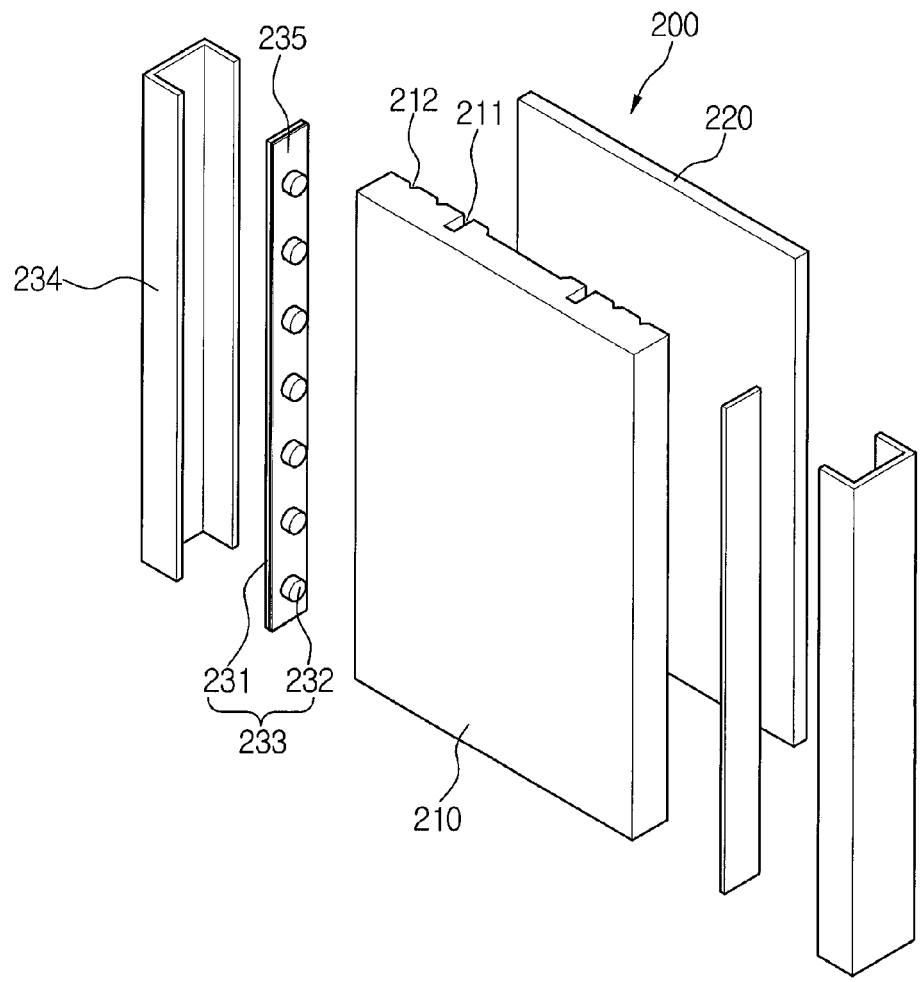
FIG. 2 is an exploded perspective view of a lighting device using a light guide plate according to the present invention.
Figure 3:
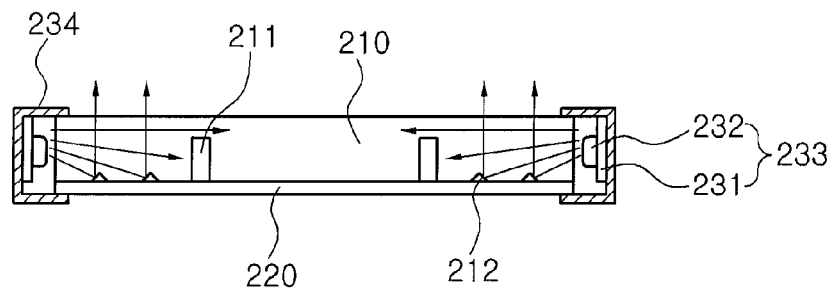
FIG. 3 is a sectional view of the lighting device using a light guide plate according to the present invention.
Figure 4:
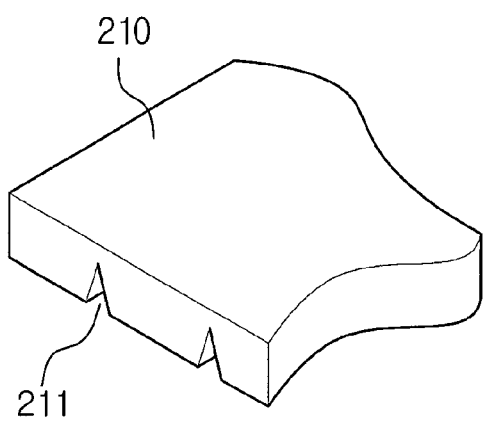
FIGS. 4(a) to 4(c) are views showing various embodiments of the light transmission preventing groove of the lighting device using a light guide plate.
Figure 4:
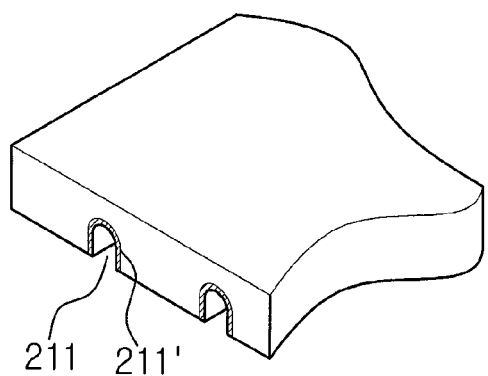
Figure 4:
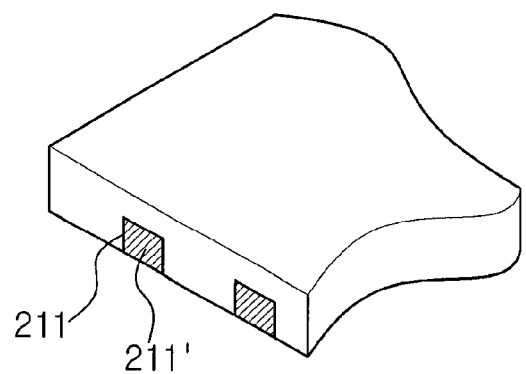
Figure 5:
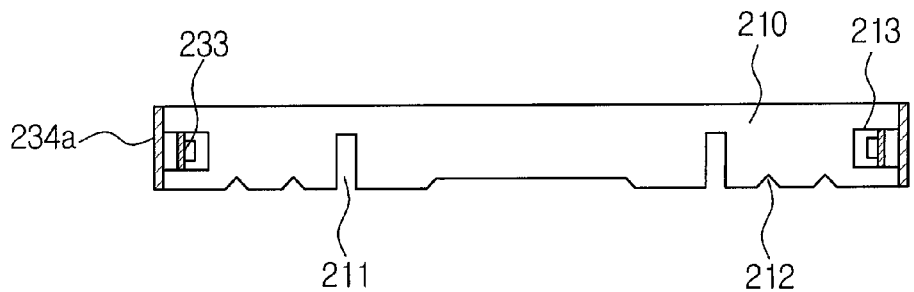
FIG. 5 is a view showing light source units that are embedded in respective ends of the light guide plate.
Figure 6:
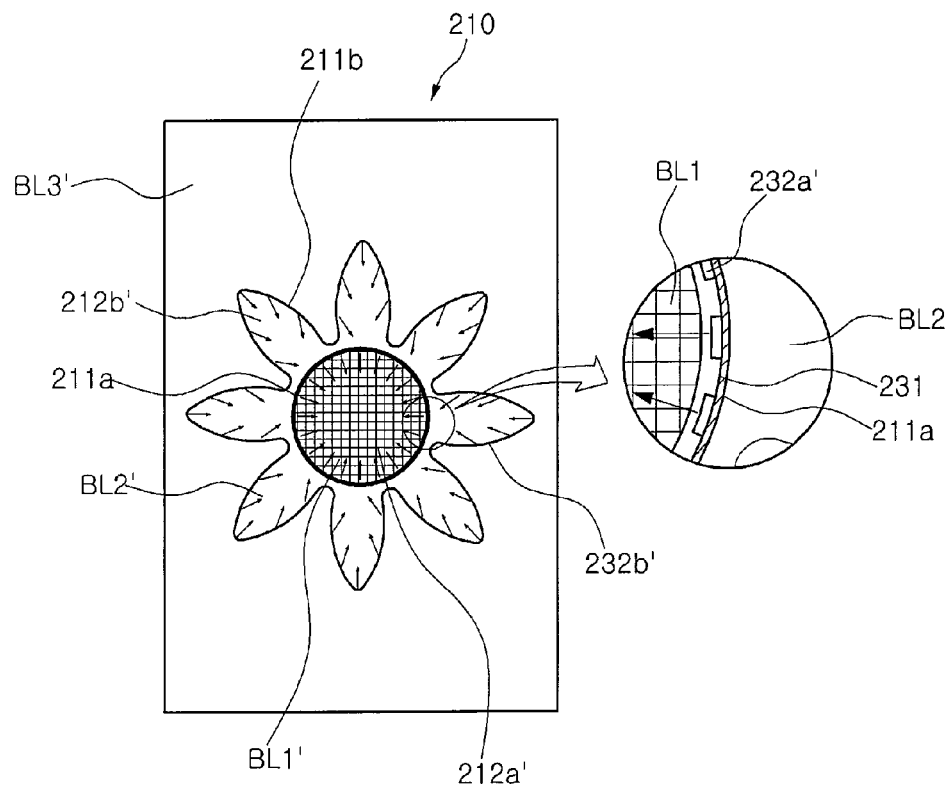
FIG. 6 is a view showing an embodiment of the lighting device using a light guide plate according to the present invention.
Figure 7:
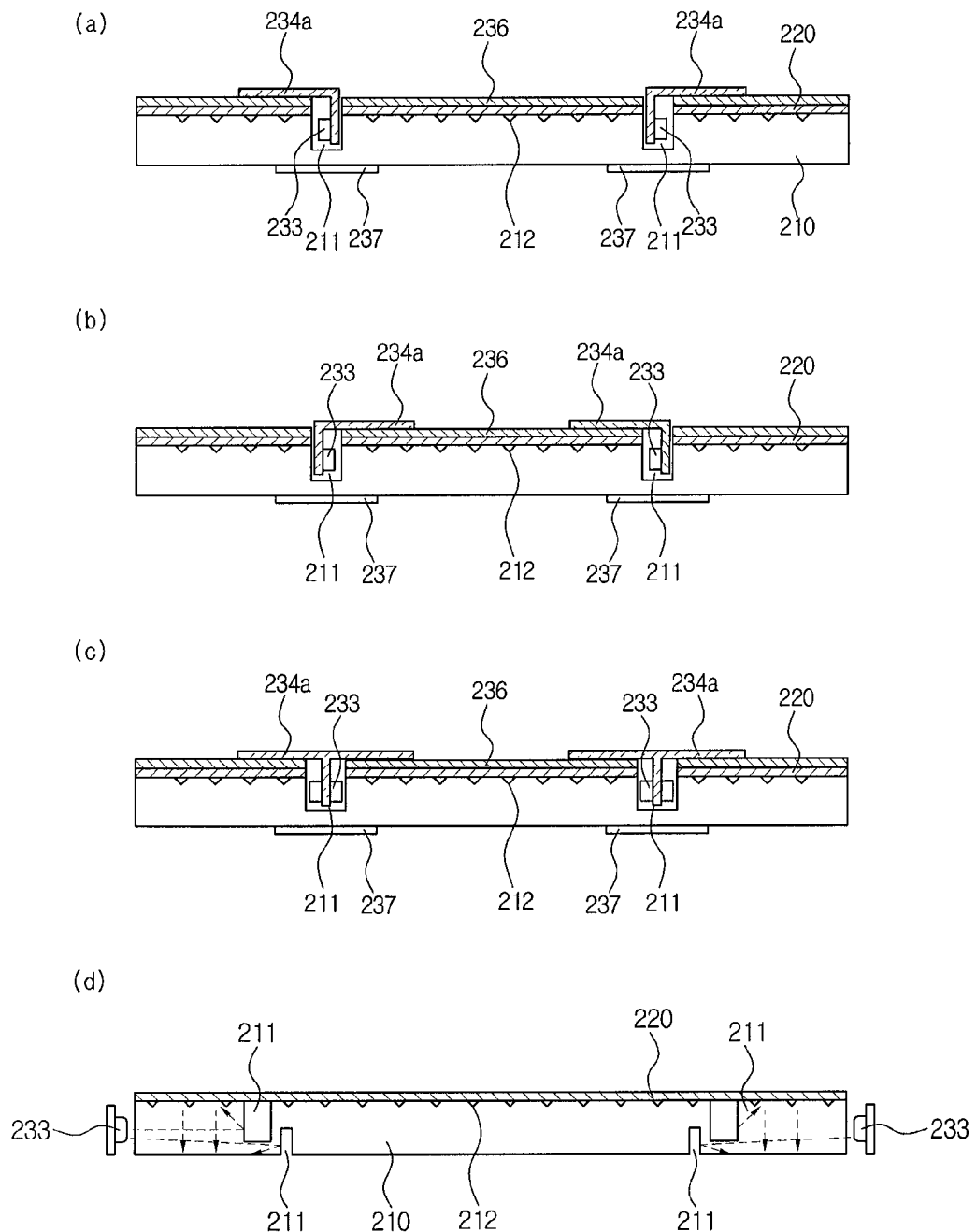
FIGS. 7(a) to 7(d) are views showing various embodiments in which light source units are mounted in respective light transmission preventing grooves in the lighting device using a light guide plate.
Figure 8:
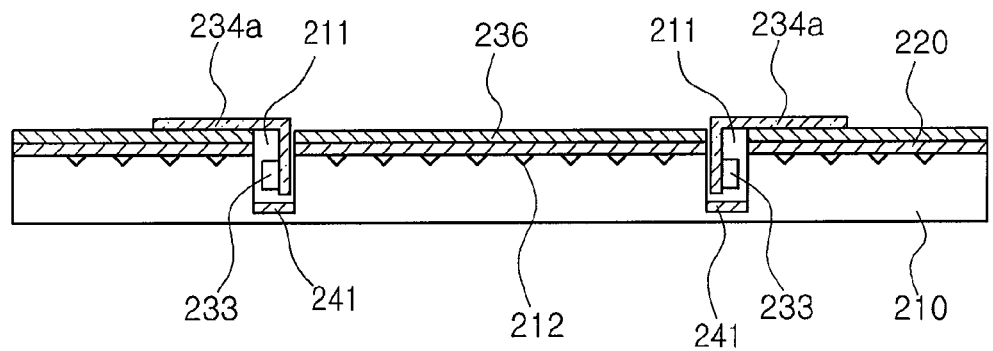
FIG. 8 is a view showing the state in which cover members are attached to the respective light transmission preventing grooves.
Figure 9:
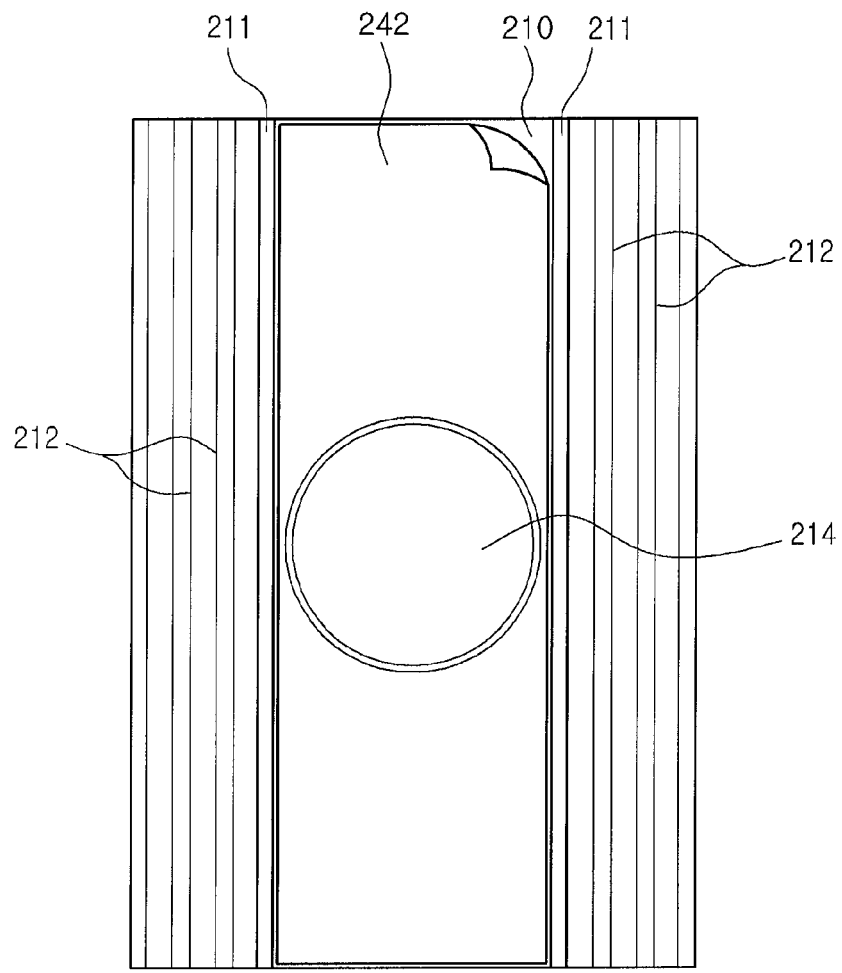
FIG. 9 is a view showing the state in which a sheet member is attached to the light guide plate.
Figure 10:
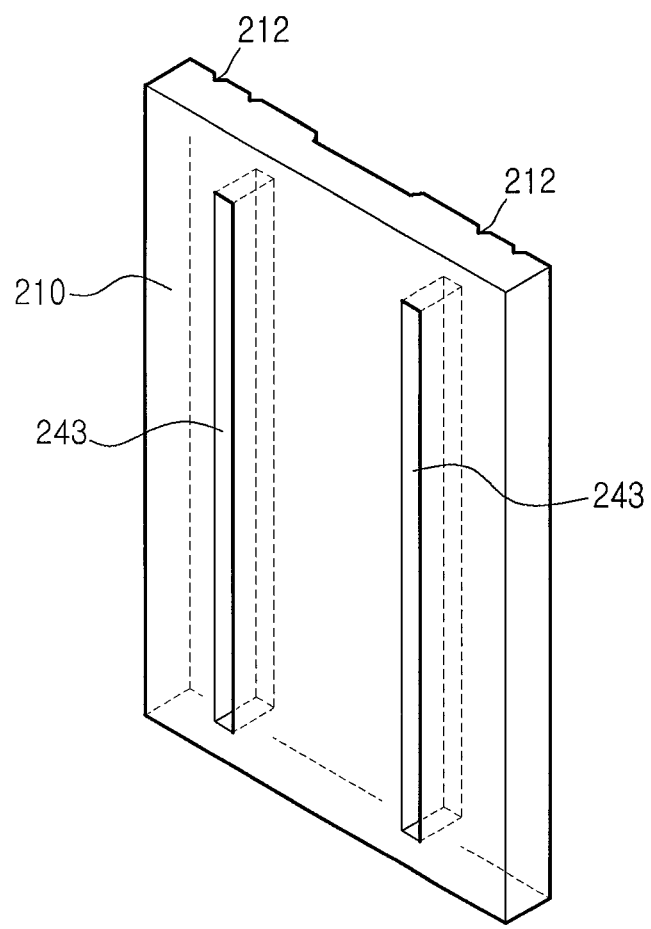
FIG. 10 is a view showing the light source unit mounting slots in the light guide plate.

FIG. 2 is an exploded perspective view of a lighting device using a light guide plate according to the present invention, FIG. 3 is a sectional view of the lighting device using a light guide plate according to the present invention, FIGS. 4(a) to 4(c) are views showing various embodiments of the light transmission preventing groove of the lighting device using a light guide plate, FIG. 5 is a view showing light source units that are embedded in respective ends of the light guide plate, FIG. 6 is a view showing an embodiment of the lighting device using a light guide plate according to the present invention, FIGS. 7(a) to 7(d) are views showing various embodiments in which light source units are mounted in respective light transmission preventing grooves in the lighting device using a light guide plate, FIG. 8 is a view showing the state in which cover members are attached to respective light transmission preventing grooves, FIG. 9 is a view showing the state in which a sheet member is attached to the light guide plate, and FIG. 10 is a view showing the light source unit mounting slots in the light guide plate.

As shown in FIG. 2, the lighting device using a light guide plate 200 according to the present invention includes a light guide plate 210, which is made of light-transmitting plastic or acryl resin, which not only facilitates the process of forming grooves in the surface thereof but also has high light transmissivity, light source units, each of which is provided with light sources 232, such as CCFLs or LEDs, which are mounted to a board 231, on which an electrical circuit having a predetermined pattern is formed, and protective covers 234, which are responsible for protecting the light source units 233.

Furthermore, as needed, the lighting device further includes a reflection sheet 220 that is coupled to the rear surface of the light guide plate 210, parallel to the light guide plate 210, and is configured to increase the light reflection efficiency.

In this case, light transmission preventing grooves 211 are formed in the rear surface of the light guide plate 210 so that the light guide plate 210 can be divided into a plurality of blocks boundary planes of which have predetermined shapes, as shown in FIG. 3. Accordingly, various shapes can be exhibited using a single light guide plate 210 and, in addition, different colors, brightnesses, luminous intensities and chromas can be exhibited by mounting the light source units, having different characteristics, in the divided portions.

Furthermore, the lighting device is configured such that light beams, which are emitted from the light source units 233, are reflected by the light reflection grooves 212 and are emitted through the front surface of the light guide plate 210, by dividing a single light guide plate 210 into a plurality of blocks, as described above, and forming light reflection grooves 212 in the divided portions according to the specific shape of an object, as in the conventional device.

Furthermore, it is preferred that a reflection unit 235 be mounted such that the light reflectance can be increased by attaching or applying a mirror or a silver paste to one side surface (or both side surfaces) of each board 231, to which light sources 232 are mounted.

When light beams, which are emitted from the light sources 232 mounted to a first board 231, are reflected by the light transmission preventing grooves 211 and are returned back, the reflected light beams are reflected again by the reflection unit 235 of the first board 231, which is mounted to the first board 231. When the light beams, which are emitted from the light sources 232 mounted to the first board 231, reach a second board 231, which is opposite the first board 231, the light beams are reflected by the reflection unit 235 of the second board 231. Accordingly, light emission efficiency with respect to the light beams that are emitted through the front surface of the light guide plate 210 can be increased.

The above-described light transmission preventing groove 211 are formed in the middle portion of the light guide plate 210 to have a predetermined width and depth, so that only portions of the light beams that are emitted from the light source units 233 of the light guide plate 210 pass through the light guide plate 210 between the light transmission preventing grooves 211 and the front surface of the light guide plate 210, and thus a lighting device 200 having different luminous intensities for respective blocks can be implemented.

That is, as shown in FIG. 3, the light guide plate 210 is divided into three blocks by forming two light transmission preventing grooves 211 in the light guide plate 210. The two outer blocks of the light guide plate 210 provide a bright luminous intensity using the light beams, which are emitted from the light source units 233 mounted close to both edges of the light guide plate 210, whereas the middle block of the light guide plate 210 provides a luminous intensity lower than those provided by the two outer block because the light beams, which are emitted from the light source units 233, are blocked by the light transmission preventing groove 211.

In this case, as shown in FIG. 3, the luminous intensity provided by the middle block of the light guide plate 210 is determined by the depths of the respective light transmission preventing grooves 211, which are formed in the light guide plate 210. When the depth of the light transmission preventing groove 211 is increased, the luminous intensity provided by the middle block of the light guide plate 210 is decreased because most of the light beams, which are emitted from the light source units 233, are blocked by the light transmission preventing groove 211. When the depth of the light transmission preventing groove 211 is decreased, the luminous intensity provided by the middle block of the light guide plate 210 is increased because the amount of light blocked by the light transmission preventing groove 211 among the light beams, which are emitted from the light source units 233, is decreased.

Meanwhile, as shown in FIG. 4(a), the above-described light transmission preventing grooves 211 are formed to have a depth such that the light guide plate 210 is not completely cut by adjusting the depth in the direction of the thickness of the light guide plate 210 according to a predetermined light transmissivity, and the surfaces of the processed light transmission preventing grooves 211 are coarse, so that the light beams, which are emitted from the light source units 233, cannot pass through the light transmission preventing grooves 211.

In this case, in order to further improve the light blocking characteristics between the divided blocks, it is preferred that light transmission preventing material or light reflecting material 211' be applied on the surfaces of the light transmission preventing grooves 211, as shown in FIG. 7(b), or that light transmission preventing material or light reflecting material 211' be charged in the light transmission preventing grooves 211 as shown in FIG. 7(d).

Furthermore, although the light transmission preventing grooves 211 are formed to have a triangular section as shown in FIG. 4(a), it may be preferred that the light transmission preventing grooves 211 be formed to have an elliptical section, as shown in FIG. 4(b), or to have an rectangular section, as shown in FIG. 4(c), so that the light source units 233 can easily be inserted into the light transmission preventing grooves 211 and fastened thereto, as shown in FIGS. 7(a) to 7(d).

Constructing the lighting device using a light guide plate 200 through the insertion of the light source units 233 into the light transmission preventing grooves 211 will be described in detail later.

Furthermore, as shown in FIG. 7(d), the light transmission preventing grooves 211 may be formed throughout the entire rear surface of the light guide plate 210 such that they are not rectilinearly located but partially overlap each other, in order to prevent the light beams from the light sources 232 from leaking into neighboring blocks.

Furthermore, although the light source units 233, each of which includes a board 231 and light sources 232, are supported and fastened to respective ends of the light guide plate 210 by the protective covers 234a, which are made of plastic or metal material, as shown in FIG. 2, the light source units 233 may be supported and fastened in such a way as to form insertion grooves 213 in the respective ends of the light guide plate 210, insert the light source units 233 so that light is emitted into the light guide plate 210, and close the insertion grooves 213 using protective covers 234, such as insulating tapes, instead of the conventional frame-type protective covers 234, as shown in FIG. 5.

The light guide plate 210 is divided into a plurality of blocks by the light transmission preventing grooves 211 as described above, and thus the lighting device using a light guide plate 200 enables the exhibition of various patterns and colors. As an example, a light transmission preventing groove 211a having a circular shape is formed such that seed parts of a sunflower can be exhibited in the central portion of the light guide plate 210, and light transmission preventing grooves 211b having a petal shape are formed around the light transmission preventing groove 211a having a circular shape, as shown in FIG. 6, and thus the light guide plate 210 is overall divided into first to third blocks BL1'~BL3' to form a sunflower shape. In this case, light reflection grooves 212a' having an orthogonal shape are formed in the first block BL1' such that the shapes of the seeds of the sunflower can be more minutely exhibited. Light reflection grooves 212b' are formed throughout the second block. Chestnut color-based light sources 232a' are inserted into the light transmission preventing groove 211a, which has a circular shape, so as to emit light beams inwards. Yellow color-based light sources 232b' are inserted into the light transmission preventing grooves 211b, which have a petal shape, so as to emit light beams inwards.

Chestnut light beams, which are emitted into the first block BL1,' are reflected by the light reflection grooves 212a,' having an orthogonal shape, and are then emitted to form an orthogonal shape through the front surface of the light guide plate 210. Yellow light beams, which are emitted into the second block BL2,' are reflected by the light reflection grooves 212b,' having a petal shape, and are then emitted to form a petal shape through the front surface of the light guide plate 210. Accordingly, the light guide plate 210 can perform all of a lighting function, and an advertising function, based on a sunflower shape.

Here, although the chestnut light sources 232a' and the yellow light sources 232b' are respectively mounted in the light transmission preventing groove 211a, which divides the light guide plate 210 into the first block BL1' and the second block BL2,' and the light transmission preventing grooves 211b, having a petal shape, which divide the light guide plate 210 into the second block BL2' and the third block BL3,' the light sources 232a' and 232b' may be mounted in a single light transmission preventing groove 211a, rather than mounting the light sources 232 in the light transmission preventing grooves 211a and 211b, so that light beams can be emitted in the opposite directions from a boundary in the light transmission preventing groove 211a.

That is, when a light source unit 233 is mounted in the light transmission preventing groove 211a, having a circular shape, the light source unit 233 may be configured such that the chestnut light sources 232a' are mounted to one surface of a board 231 and such that the yellow light sources 232b' are mounted to the other surface of the board 231. In this case, the chestnut light sources 232a' emit light beams inwards, but the yellow light sources 232b' emit light beams outwards.

Furthermore, as shown in FIGS. 7(a) to (d), the light source units 233 are inserted into the respective light transmission preventing grooves in the light guide plate 210, and thus a lighting device using a light guide plate 200, which is larger and brighter than the conventional lighting device using a light guide plate 100, can be constructed.

Figure 1:
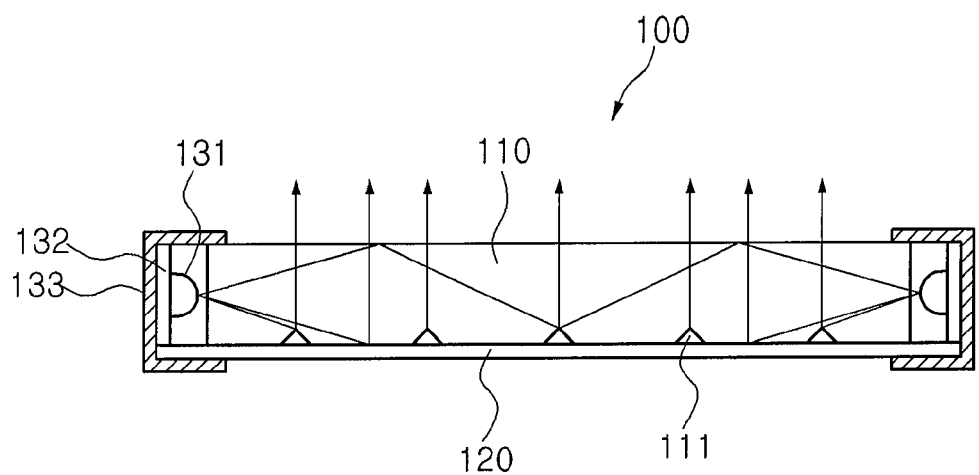
FIG. 1 is a sectional view of a conventional lighting device using a light guide plate.

In the conventional lighting device using a light guide plate 100, the light sources 131 are mounted only close to both edges of the light guide plate 100, as shown in FIG. 1, so that there is a limitation in the ability to increase the luminous intensity provided by the lighting device using a light guide plate 100, and thus it is difficult to manufacture a large lighting device using a light guide plate 100. However, in the lighting device using a light guide plate 200 according to the present invention, the light source units 233 are inserted into the light transmission preventing grooves 211 in the lighting device using a light guide plate 200, and thus it is possible to manufacture a lighting device using a light guide plate 200, which is brighter and larger than the conventional lighting device using a light guide plate 100.

When the light source units 233 are inserted into the light transmission preventing grooves 211 in the light guide plate 210 as described above, [- or ]-shaped metal protective covers 234a are coupled to respective rear surface of the light source units 233 and are inserted into the light transmission preventing grooves 211 in the light guide plate 210, so that the maintenance of the light source units 233 can be facilitated and the life span of the light source units 233 can also be extended to enable the heat, which is generated when light beams are emitted from the light source units 233, to be radiated to the outside through the protective covers 234a.

Furthermore, light source units 233 are mounted on respective side surfaces of each ][-shaped metal protective cover 234a and are inserted into a corresponding light transmission preventing groove 211, so that light beams can be emitted to respective blocks of each light transmission preventing groove 211, therefore the luminous intensity provided by the lighting device using a light guide plate 200 can be increased.

The above-described examples, in which the light source units 233 are coupled to the metal protective covers 234a and are inserted into the light transmission preventing grooves 211 in the light guide plate 210, are shown in FIGS. 7(a) to 7(c).

When two light transmission preventing grooves 211 are formed in the light guide plate 210, three blocks are formed. In FIG. 7(a), the light sources of the light source units 233 emit light beams to the outer blocks of the light guide plate 210, and thus the outer blocks of the light guide plate 210 can emit light beams brighter than the middle block of the light guide plate 210. Furthermore, in FIG. 7(b), the light sources of the light source units 233 emit light beams to the middle block of the light guide plate 210, and thus the middle block of the light guide plate 210 can emit light beams brighter than the outer blocks of the light guide plate 210. Furthermore, in FIG. 7(c), the light source units 233, on respective side surfaces of each of which light sources are mounted, are inserted into the light transmission preventing grooves 211, and thus a lighting device using a light guide plate 210 that emits light beams brighter than the light guide plate 210 in FIGS. 7(a) and 7(b) can be achieved.

Furthermore, a fastening plate 236 is coupled to the rear surface of the reflection sheet 220, which enables the light beams, which are emitted from the light source units 233, to be emitted only in the direction of the front surface of the light guide plate 210, to thus enable the reflection sheet 220 to be in close contact with the light guide plate 210, and thus the light beams can be more desirably reflected. Furthermore, it is preferred that the fastening plate 236 be made of metal material so that it is in close contact with the protective covers 234a of the lighting modules 233, which are inserted into the respective light transmission preventing grooves 211 in the light guide plate 210, to transmit the heat that is generated by the light source units 233 and is radiated through the protective covers 234a, to the fastening plate 236, thus increasing cooling efficiency thanks to the increased heat dissipation area.

Further, as shown in FIGS. 7(a) to (c), it is preferred that stripe-shaped cover sheets 237 be attached to the front surface of the light guide plate 210, having the light transmission preventing grooves 211, into which the light source units 233 are inserted, or that cover sheets 237 be printed on the front surface of the light guide plate 210, having the light transmission preventing grooves 211, into which the light source units 233 are inserted, to have a stripe shape, thus preventing the light transmission preventing grooves 211, into which the light source units 233 are inserted, from being viewed from the front of the light guide plate 210.

Furthermore, the lighting device using a light guide plate 200 may be configured in such a way as to form the light transmission preventing grooves 211 in the front surface of the light guide plate 210, rather than the rear surface of the light guide plate 210, insert the light source units 233, to which the protective covers 234 are coupled, into the light transmission preventing grooves 211 formed in the light guide plate 210, and close the inlets of the light transmission preventing grooves 211, into which the light source units 233 are inserted, using a piece of tape.

When maintenance is required in the event of trouble with the light source units 233, such maintenance is conducted in such a way as to remove the tape without detaching the light guide plate 210 from a wall, and to replace or repair the light source units 233, which are inserted into the light transmission preventing grooves 211 formed in the front surface of the light guide plate 210, so that the maintenance of the above-described lighting device using a light guide plate 200, which is configured such that the light source units 233 are inserted into the front surface of the light guide plate 210, can be facilitated.

Furthermore, although the cover sheets 237 are attached to the front surface of the light guide plate 210 to prevent the light source units 233 from being viewed, as shown in FIGS. 7(a) to (c), in the case where the light source units 233 are inserted into the light transmission preventing grooves 211 formed in the rear surface of the light guide plate 210, cover members 241 may be formed on the respective bottoms of the light transmission preventing grooves 211, into which the light source units 233 are inserted, not only to prevent the light source units 233 from being viewed from the front of the light guide plate 210 but also to realize a fine outward appearance.

In this case, if the cover members 241 are made of material identical to that of the reflection sheet 220 attached to the rear surface of the light guide plate 210, the cover members 241, which are attached to the bottoms of the light transmission preventing grooves 211, and the reflection sheet 220, which is attached to the rear surface of the light guide plate 210, can have a unified appearance when viewed from the front of the light guide plate 210.

Furthermore, as shown in FIG. 9, the lighting device using a light guide plate 200 is configured by attaching a sheet member 242, such as a colored sheet, a piece of paper, or a piece of cloth, to the rear surface of a specific block of the light guide plate 210, which is divided into a plurality of blocks by the light transmission preventing grooves 211, and thus different colors and different tactile senses can be imparted to respective blocks of the lighting device using a light guide plate 200.

Furthermore, as shown in FIG. 10, the light sources 232, such as LEDs or CCFLs, may be inserted into slots 243 for the light source units 233, which are formed by perforating the light guide plate 210 and have a predetermined width and length. In this case, large light sources 232, such as LEDs or CCFLs, may be easily inserted into the above-described slots 243, which are formed by perforating the light guide plate 210.

Furthermore, it is preferred that the above-described lighting device 200 using a light guide plate 210, which can be used as a lighting, interior and advertising means, be configured such that a through-hole 214, having a predetermined shape, is formed in the light guide plate 210, not only to prevent the outer appearance of the lighting device 200 using a light guide plate 210 from being spoiled, but also to enable installation thereof on a wall surface or a ceiling, as shown in FIG. 9, and such that a fastening frame (not shown) is mounted to come into contact with one or more surfaces of the through-hole, and the fastening frame is coupled with a support rod, which is installed on a wall surface or a ceiling.

Furthermore, although the fact that a predetermined shape can be exhibited by emitting the light beams, which are reflected by the light reflection grooves 212, through the front surface of the light guide plate 210 has already been described, it is preferred that a printed layer (not shown) or a depression be formed on or in the front surface of the light guide plate 210, which corresponds to a portion in which the light reflection grooves 212 are not formed, in such a way as to attach a film, on which various shapes are printed, or to draw a picture having a predetermined shape, thus exhibiting various shapes using all of the light beams that are emitted by the printed layer, the depression and the light reflection grooves 212. This is included within the scope of the present invention.

The lighting device using a light guide plate according to the present invention has been described above. It will be appreciated by those skilled in the art that the above-described technical construction of the present invention may be implemented in various ways without changing the technical spirit or essential features of the present invention.

Accordingly, the above-described embodiments must be understood as being illustrative, rather than restrictive, in all aspects. The scope of the present invention is defined by the following claims, rather than by the above-described detailed description. The meanings and scope of the claims, and all modifications or modified shapes, which are derived from equivalent concepts thereof, should be understood as being included in the scope of the present invention.

INDUSTRIAL APPLICABILITY

The present invention relates to a lighting device using a light guide plate, which can realize both a lighting function and an advertising function by emitting light beams, which are emitted from light sources, through the light guide plate and, more particularly, to a lighting device using a light guide plate, which enables the light guide plate to be divided into a plurality of light emission blocks, and enables different light beams to be emitted to the respective blocks, thus being easily installed on a wall surface or a ceiling without spoiling the outward appearance of the device, as well as realizing different levels of brightness for the respective blocks, enabling the expression of various shapes or colors, and having a brighter luminous intensity than that provided by a conventional light guide plate.

The invention claimed is:

1. A lighting device using a light guide plate, comprising:
a light guide plate, formed by a single monolithic slab, having elongated dividing grooves extended from a rear surface of the light guide plate for dividing a front surface which light beams are emitted into a plurality of portions by blocking of the light transmission through the dividing grooves;
light source units that emit the light beams toward the sidepiece of the light guide plate, wherein the light source units are inserted into the dividing grooves;
a reflection sheet coupled to a rear surface of the light guide plate, forming a light reflection unit, to reflect light beams, which are emitted from the light source units, in a direction of a front surface of the light guide plate; and
one selected from among a colored sheet, a piece of paper and a piece of cloth, which is attached to the rear surface of a specific block of the plurality of portions of the light guide plate, such that different colors and different tactile senses are imparted to the specific block of the light guide plate, compared with other regular blocks of the light guide plate having rear surfaces attached by the reflection sheets,
wherein the light reflection unit is provided with either light reflection grooves or a printed layer,
wherein each of the light source units is mounted so as to emit light to any or all of two portions of the light guide plate, which are obtained by dividing the light guide plate along a boundary line of each of the dividing groove.

2. The lighting device according to claim 1, further comprising: a fastening plate coupled to a rear surface of the reflection sheet to bring the reflection sheet into close contact with the light guide plate, and brought into close contact with the protective covers of the light source units to radiate heat generated by the light source units.

3. The lighting device according to claim 2, wherein the light source units comprising;
a board on which an electrical circuit having a predetermined pattern is formed; light sources mounted to a board to emit the light beams; and
a reflection unit mounted to a board to increase the light reflectance.

4. The lighting device according to claim 3, further comprising: protective covers coupled to respective rear surfaces of the light source units to protect the light source units from an external environment and to radiate heat generated by the light source units.

5. The lighting device according to claim 1, wherein the dividing grooves are slots that are formed in the light guide plate.

* * * * *